(12) United States Patent
Cao et al.

(10) Patent No.: US 9,407,680 B2
(45) Date of Patent: *Aug. 2, 2016

(54) QUALITY-OF-EXPERIENCE MEASUREMENT FOR VOICE SERVICES

(71) Applicant: EMPIRE TECHNOLOGY DEVELOPMENT LLC, Wilmington (DE)

(72) Inventors: Junwei Cao, Beijing (CN); Han Qian, Beijing (CN); Junwei Li, Beijing (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,920

(22) Filed: Sep. 25, 2015

(65) Prior Publication Data

US 2016/0014187 A1 Jan. 14, 2016

Related U.S. Application Data

(63) Continuation of application No. 13/641,701, filed as application No. PCT/CN2011/070903 on Feb. 10, 2011, now Pat. No. 9,185,005.

(51) Int. Cl.
*H04L 29/06* (2006.01)
*H04L 12/24* (2006.01)
(Continued)

(52) U.S. Cl.
CPC ............... *H04L 65/80* (2013.01); *G10L 25/09* (2013.01); *G10L 25/60* (2013.01); *G10L 25/63* (2013.01);
(Continued)

(58) Field of Classification Search
CPC ............ H04L 41/5067; H04L 41/5054; H04L 47/788; H04L 47/805; H04L 47/765
See application file for complete search history.

(56) References Cited

U.S. PATENT DOCUMENTS 6,690,919 B1 2/2004 Weber
9,185,005 B2 * 11/2015 Cao ..................... H04L 41/5067
(Continued)

FOREIGN PATENT DOCUMENTS

CN 101577631 A 11/2009
EP 2244426 A1 10/2010
(Continued)

OTHER PUBLICATIONS

International Search Report and Written Opinion of The International Searching Authority, International application No. PCT/CN2011/070903, Nov. 17, 2011.
(Continued)

*Primary Examiner* — Siming Liu
(74) *Attorney, Agent, or Firm* — Ren-Sheng International

(57) ABSTRACT

An example method to determine a quality-of-experience (QoE) metric for a network communication includes receiving a media signal from the network communication, wherein the media signal includes a voice component, extracting an experience indicator from the voice component, wherein the experience indicator is a voice feature descriptive of a service quality of the network communication, evaluating the experience indicator, retrieving a quality-of-service (QoS) metric if the evaluated experience indicator reflects the service quality of the network possibly being subpar, and determining the QoE metric for the network communication based on the evaluated experience indicator and the retrieved QoS metric for the network communication.

20 Claims, 6 Drawing Sheets

(51) Int. Cl.
  *G10L 25/09* (2013.01)
  *G10L 25/60* (2013.01)
  *G10L 25/63* (2013.01)
  *G10L 25/90* (2013.01)
  *H04L 12/26* (2006.01)

(52) U.S. Cl.
  CPC ............ *G10L 25/90* (2013.01); *H04L 41/5067* (2013.01); *H04L 43/0852* (2013.01); *H04L 65/1083* (2013.01); *G10L 2025/906* (2013.01)

(56) References Cited

U.S. PATENT DOCUMENTS

| | | |
|---|---|---|
| 2008/0104228 A1 | 5/2008 | Dacosta |
| 2011/0090922 A1 | 4/2011 | Wang et al. |
| 2011/0234488 A1 | 9/2011 | Ge et al. |
| 2013/0051271 A1 | 2/2013 | Cao et al. |
| 2013/0223208 A1 | 8/2013 | Liao et al. |
| 2013/0290525 A1 | 10/2013 | Fedor et al. |

FOREIGN PATENT DOCUMENTS

| | | |
|---|---|---|
| JP | 2002514034 A | 5/2002 |
| JP | 2010157793 A | 7/2010 |
| WO | 03032563 A1 | 4/2003 |
| WO | 2008092473 A1 | 8/2008 |
| WO | 2010000168 A1 | 1/2010 |

OTHER PUBLICATIONS

Wen Zhang, "Designing Packet Network QoS Mechanism Based on QoE. Modern Science & Technology of Telecommunications", Sep. 2004, pp. 34-36, ISSN 1002-5316.

Federal Republic of Germany, Draft Text for a New Recommendation on the Subjective Quality Evaluation of Telephone Services Based on Spoken Dialogue Systems, ITU, Jul. 2003, COM12-059-E.

Prasad Calyam et al., "A "Gap-Model" based Framework for Online VVoIP QoE Measurement", KICS, 2007, pp. 12.

David Soldani, "Means and Methods for Collecting and Analyzing QoE Measurements in Wireless Networks", Proceedings of the 2006 International Symposium on a World of Wireless, Mobile and Multimedia, 2006, pp. 5, IEEE Computer Society.

Andrew Perkis et al., "A model for measuring Quality of Experience", NORSIG, 2006, pp. 198-201, Norwegian University of Science and Technology, Trondheim, Norway.

Nokia, "Quality of Experience (QoE) of mobile services: Can it be measured and improved?", White Paper, 2004, pp. 7, Nokia and Nokia Connecting People, Finland http://www.nokia.com/NOKIA_COM_1/About_Nokia/Press/White_Papers/pdf_files/whitepaper_qoe_net.pdf.

Elliot Moore, II et al., "Investigating the Role of Glottal Features in Classifying Clinical Depression", Proceedings of the 25th Annual International Conference of the IEEE EMBS, Sep. 2003, pp. 2849-2852, Cancun, Mexico.

R. M. Hegde et al., "Emotion Detection from Speech Signals and its Applications in Supporting Enhanced QoS in Emergency Response", Emotion Detection from Speech Signals and its Applications in Networking, May 2006, pp. 82-91, Proceedings of the 3rd international ISCRAM Conference, Newark, NJ (USA).

Jia-Lin Shen et al., "Robust Entropy-based Endpoint Detection for Speech Recognition in Noisy Environment", 5th International Conference on Spoken Language Processing, paper 0232, 1998.

ITU-T Recommendation P. 800, "Methods for Subjective Determination of Transmission Quality", ITU, 1996.

Antony W. Rix et al., "Perceptual Evaluation of Speech Quality (PESQ)—A New Method for Speech Quality Assessment of Telephone Networks and Codecs", IEEE ICASSP, May 2001.

Tobias Hobfeld et al, "Analysis of Skype VoIP traffic in UMTS: End-to-end QoS and QoE measurements", The International Journal of Computer and Telecommunications Networking, 2008, pp. 650-666, vol. 52, No. 3.

Jike Chong et al., "Data-Parallel Large Vocabulary Continuous Speech Recognition on Graphics Processors", Proceedings Intl. Workshop on Emerging Applications and Many Core Architectures, May 22, 2008.

James R. Glass et al., "Real-Time Telephone-based Speech Recognition in the Jupiter Domain", Proceedings ICASSP, Mar. 1999, Phoenix.

R. Huber et al., "Recognition of Emotion in a Realistic Dialogue Scenario", ICSLP, 2000, Beijing, China.

Ying Wang, "Research on Adaptive Speech Emotion Recognition Method", Mater's Dissertation, Jun. 2009, JiangSu University.

Regis Cabral, "QoE: Quality of Experience: A Conceptual Essay", in IFIP International Federation for Information Processing, 2007, pp. 193-199, vol. 252.

Stefan Winkler, "Quality of Experience (QoE): An Important Measure of Success for IP-based Video Services", Symmetricom white paper, Oct. 2007, pp. 7.

The Extended European Search Report, Application No. 11858142. 0-1853/2673980, Jun. 16, 2014.

Marcio Nieblas Zapater et al., "A Proposed Approach for Quality of Experience Assurance for IPTV", Proceedings of the First International Conference on the Digital Society, 2007, IEEE.

* cited by examiner (500) A computer product (502) Signal bearing medium (504) at least one of one or more instructions for receiving a media signal from a network communication;

extracting an experience indicator from the media signal, wherein the experience indicator corresponds to a participant's subjective usage experience associated with a service quality of the network communication; and determining the QoE metric for the network communication based on the experience indicator and a quality-of-service (QoS) metric for the network communication.

| (506) A computer readable medium | (508) A recordable medium | (510) A communications medium |

Fig. 5

QUALITY-OF-EXPERIENCE MEASUREMENT FOR VOICE SERVICES

CROSS-REFERENCE TO RELATED APPLICATIONS

The present application is a continuation application under 35 U.S.C. §120 of the U.S. application Ser. No. 13/641,701, filed Oct. 17, 2012, now Pat. No. 9,185,005, which is a U.S. National Stage filing under 35 U.S.C. §371 of International Application PCT/CN2011/070903, filed Feb. 10, 2011. The U.S. application and the International application, including any appendices or attachments thereof, are incorporated by reference herein in their entirety.

BACKGROUND

In the field of computer networking, one approach in evaluating the performance of a network communication is to collect the quality-of-service (QoS) or the quality-of-experience (QoE) metrics for the network communication. The QoS may contain objective metrics such as bit rate, latency, and bit error rate, which are collected from different network layers during a session of the network communication. However, merely examining the QoS metrics may not be sufficient to adequately address the performance problems associated with the network communication.

The network communication may also be evaluated by determining QoE metrics, which may be a way of inferring overall service quality experienced by end-users or network applications. There are two conventional QoE measuring algorithms, the Mean Opinion Score (MOS) and the Perceptual Evaluation of Speech Quality (PESQ). PESQ approach may be applicable in measuring quality of network applications using VOIP, POTS, ISDN, GSM protocols, and have a value between −0.5 (worst) to 4.5 (best) for describing the satisfaction of a user with the quality of the network communication. The MOS may express the quality of a voice call with values such as bad, poor, fair, good, and excellent. However, these conventional approaches are still objective measurements that do not take subjective factors into consideration. Further, these conventional approaches are hard to be conducted in real-time.

SUMMARY

In accordance with at least some embodiments of the present disclosure, a method for determining a quality-of-experience (QoE) metric for a network communication is presented. In an example, the method may include receiving a media signal from the network communication. The method may also include extracting an experience indicator from the media signal, wherein the experience indicator corresponds to a participant's subjective usage experience associated with a service quality of the network communication; and determining the QoE metric for the network communication based on the experience indicator and a quality-of-service (QoS) metric for the network communication.

In accordance with other embodiments of the present disclosure, a method for determining quality of a network communication is presented. In an example, the method may include receiving a media signal from the network communication. The method also includes extracting a first corpus from the media signal, wherein the first corpus corresponds to a participant's subjective usage experience associated with a service quality of the network communication; and determining a first QoE metric for the network communication based on the first corpus and a quality-of-service (QoS) metric for the network communication.

In accordance with at least some embodiments of the present disclosure, a machine-readable medium may contain a set of instructions which, when executed by a processor, cause the processor to perform a method for determining a quality-of-experience (QoE) metric for a network communication. The method may include receiving a media signal from the network communication. The method may further include extracting an experience indicator from the media signal, wherein the experience indicator corresponds to a participant's subjective usage experience associated with a service quality of the network communication; and determining the QoE metric for the network communication based on the experience indicator and a quality-of-service (QoS) metric for the network communication.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 shows an illustrative embodiment of an example computer program product arranged in accordance with the present disclosure.

DETAILED DESCRIPTION

Figure 1:
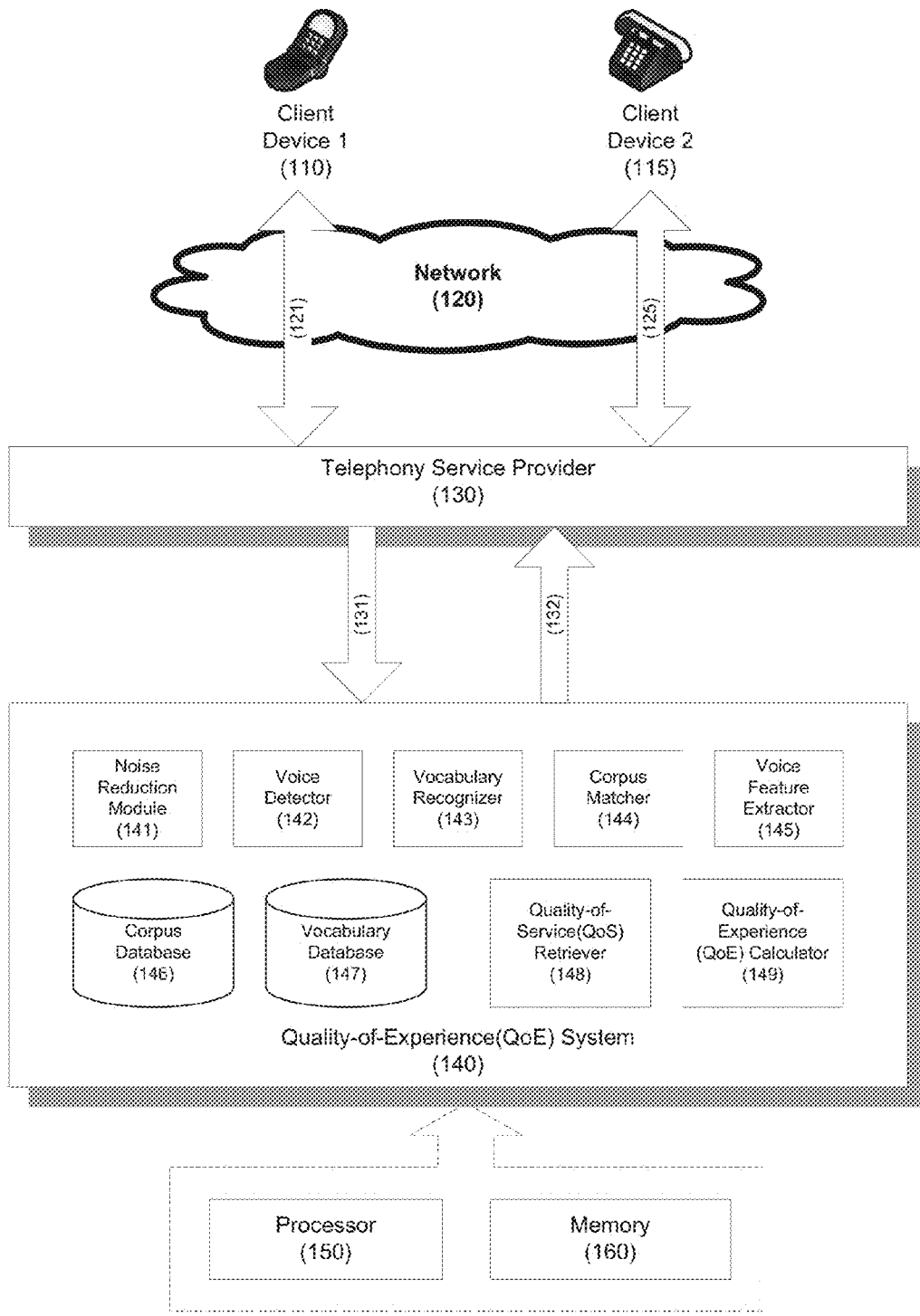
FIG. 1 shows a block diagram of an operational environment in which illustrative embodiments of a system may operate to determine QoE metric for a network communication.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatus, computer programs and systems related to the calculating of quality-of-experience metric for a network communication. Throughout the disclosure, the term "quality-of-service", or "QoS," may broadly refer to the quality of a network communication in terms of metrics such as bandwidth, signal-to-noise ratios, bit error rate, latency, packet losses, or other measurements collected from various network segments (e.g., access, metro, or core segments). The term "quality-of experience", or "QoE," may refer to metrics that can be used to describe the performance of a network communication from the perspective of a network communication participant. Thus, a QoE metric may subjectively indicate whether a network communication is performing in a satisfactory manner, while a QoS metric may objectively provide a quantitative measurement associated with how the network communication is performing.

Throughout the disclosure, the term "experience indicator" may broadly refer to a subjective evaluation associated with a participant's network service usage experience. The participant may be a telephony device, a network device, a network application, a network/telephony service user (e.g., a telephony user), or any end users who are actively participating in the network communication. When using a specific network service, the participant may be in a position to judge the quality of the network service based on its own experience, and provide such judgment via the experience indicator. For example, a telephony user may express the usage experience in spoken words, or show the usage experience in voice emotion, facial expression, and/or body gesture. Also, the experience indicator may be in the form of measurements or categorizations. For example, the experience indicator may be a numerical (e.g., a numerical range between 0-100) measurement or a good-fair-bad categorization conveyed by the participant.

FIG. 1 shows a block diagram of an operational environment in which illustrative embodiments of a system may operate to determine QoE metric for a network communication. As depicted in FIG. 1, a client device 110 may be configured to interact with another client device 115 via a network 120. The network 120 may be provided and managed by a telecommunication (Telco) service provider 130. A Quality-of-Experience (QoE) system 140 may interact with the telco service provider 130 to monitor the network communications between the client devices 110 and 115, and to calculate QoE metrics for these network communications.

In some embodiments, the client devices 110 and 115 may be configured to interact with other applications and/or devices in providing audio, video, and/or other telecommunication services. Some examples of the client devices 110 and 115 may include, without limitation, a conventional telephone, cell phone, smart-phone, Personal Digital Assistant (PDA), tablet computer, laptop computer, netbook, or other network appliance capable of communicating over the network 120. The client devices 110 and 115 may be mobile devices that support various mobile telecommunication standards such as, without limitation, Global System for Mobile communication (GSM), Code Division Multiple Access (CDMA), or Time Division Multiple Access (TDMA). Further, the client devices 110 and 115 may transmit video signals which show the faces and bodies of the participants of a multi-party video conference.

In some embodiments, the network 120 may be, without limitation, a wireless network, such as mobile device network (e.g., GSM, CDMA, or TDMA), wireless local area network (WLAN), wireless Metropolitan area network (WMAN), or the like or any combination thereof. The network 120 may also be a wired network, such as phone line, local area network (LAN), wide area network (WAN), metropolitan area network (MAN), global area network such as the Internet, a Fibre Channel fabric, or any combination of such interconnects.

In some embodiments, the client devices 110 and 115 may be connected via a network connection through the network 120, and may participate in a two-way or multi-way network communication to transmit voice and/or video signals. A network communication may be a network message that is transmitted via a network connection provided by a network. The network communications may be in the forms of telephony communication, audio/video communication, multimedia communication, SMS messages, and/or any type of network messages that may be exchanged among the devices coupled to the network 120.

For example, a network connection may be established between two client devices 110 and 115 via a telephone line, and the speeches made by the speakers during a telephone conversation may be deemed network communications. Thus, the client device 110 may transmit a first network communication 121 to the client device 115. And the client device 115 may respond with a second network communication 125 to the client device 110. Alternatively, the client device 115 may initiate a third network communication 125 to the client device 110, and the client device 110 may respond with a fourth network communication 121. The network communications 121 and 125 may be in digital or analog formats, and may contain human-spoken voice signals, or video signals showing human faces and body parts. In other embodiments, more than two client devices may participate in multi-way (e.g., three-way conference call) network communications. In this case, the client device 110 may simultaneously transmit a first network communication 121 to more than one target client devices, or receive a second network communication 121 from more than one target client devices at the same time.

In some embodiments, the telephony service provider 130 may be responsible for managing the network 120, and establishing network connections among the devices on the network 120. The telephony service provider 130 may also communicate with the QoE system 140 for determining the QoE metrics that are associated with the network communications 121 and 125 between the client devices 110 and 115. The QoE system 140 may be configured as a server or a router coupled with the telephony service provider 130, or as a component of the telephony service provider 130. Further, the telephony service provider 130 may transmits the network communications (e.g., the network communications 121 and 125) as a real time input stream 131 to the QoE system 140.

In some embodiments, the QoE system 140 may evaluate the network communications received from the input stream 131 to determine the quality of the network communications being conducted between the client devices 110 and 115. The result of the evaluation may be QoE metrics for the network communications 121 and 125, which may be sent as an output stream 132 to the telephony service provider 130 and/or the client devices 110 and 115 for, by way of example, status reporting, feature enhancement, or debugging purposes. The details of the QoE system 140 are further described below.

In some embodiments, the QoE system 140 may determine QoE metrics for voice and video network communications. By way of an example, the following description may emphasize more on QoE metrics for voice signals. For network communications that contain video signals, the following processes and mechanisms may similarly be applicable. For processing voice signals in the network communication, the QoE system 140 may utilize, among other components, a noise reduction module 141, a voice detector 142, a vocabulary recognizer 143, a corpus matcher 144, a voice feature extractor 145, a corpus database 146, a vocabulary database 147, a QoS retriever 148, and a QoE calculator 149.

In some embodiment, the noise reduction module 141 may filter noise from the voice signals extracted from the network communications in the input stream 131. The voice detector 142 may detect human voices in the filtered voice signals, and extract voice segments from the voice signals. The voice detector 142 may also assign the start and end time of the voice segments. The vocabulary recognizer 143 may compare these voice segments with the samples from the vocabulary database 147, and recognize words in these voice segments. The words and their corresponding start times and end times may then be sent to the corpus matcher 144.

In some embodiments, a corpus is an utterance which is related to a certain QoE condition. The corpus database 146 may contain a collection of such utterances for various QoE conditions. For example, when users are experiencing network delays, they may utter some common phrases such as, without limitation, "are you still there," and "hello." For jitter conditions, the utterances may be "pardon," "sorry," or "can you speak again." For voice decay condition, the common utterances may be "can't hear you" or "can you speak louder." The corpus matcher 144 may use the sample utterances stored in the corpus database 146 to match the words that are detected from the voice signals. If there is a corpus found, then it may be an indication that the participants of the network communications are experiencing some kind of QoE issues. If no corpus is found, then it may also be a sign that the participants are satisfied with the quality of the network communication.

In some embodiments, the voice feature extractor 145 may extract one or more voice features from the voice signals. The voice feature, such as intonation, pacing, pitch, and voice volume, may be an indication of the quality of the network communication experienced by the participant. The voice features and the corpuses may be deemed the experience indicators, which provide subjective evaluation of the quality of the network communication experienced by the participants. If the experience indicators show that the quality of the network communication may be subpar, the QoE calculator 149 may utilize the QoS retriever 148 to retrieve QoS metrics for the network communications. The QoE calculator 149 may then determine the QoE metric for the network communications based on the QoS metrics and the experience indicators.

In some embodiments, the QoE system 140 may be implemented with one or more processors 150 and memory 160. The processor 150 may generally control operations of the QoE system 140 in performing QoE calculations, and the memory 160 may be configured to store machine-readable instructions that, if executed by the processor 150, can perform the above operations. The details of the QoE system 140, the processor 150, and the memory 160 are further described below.

Figure 2:
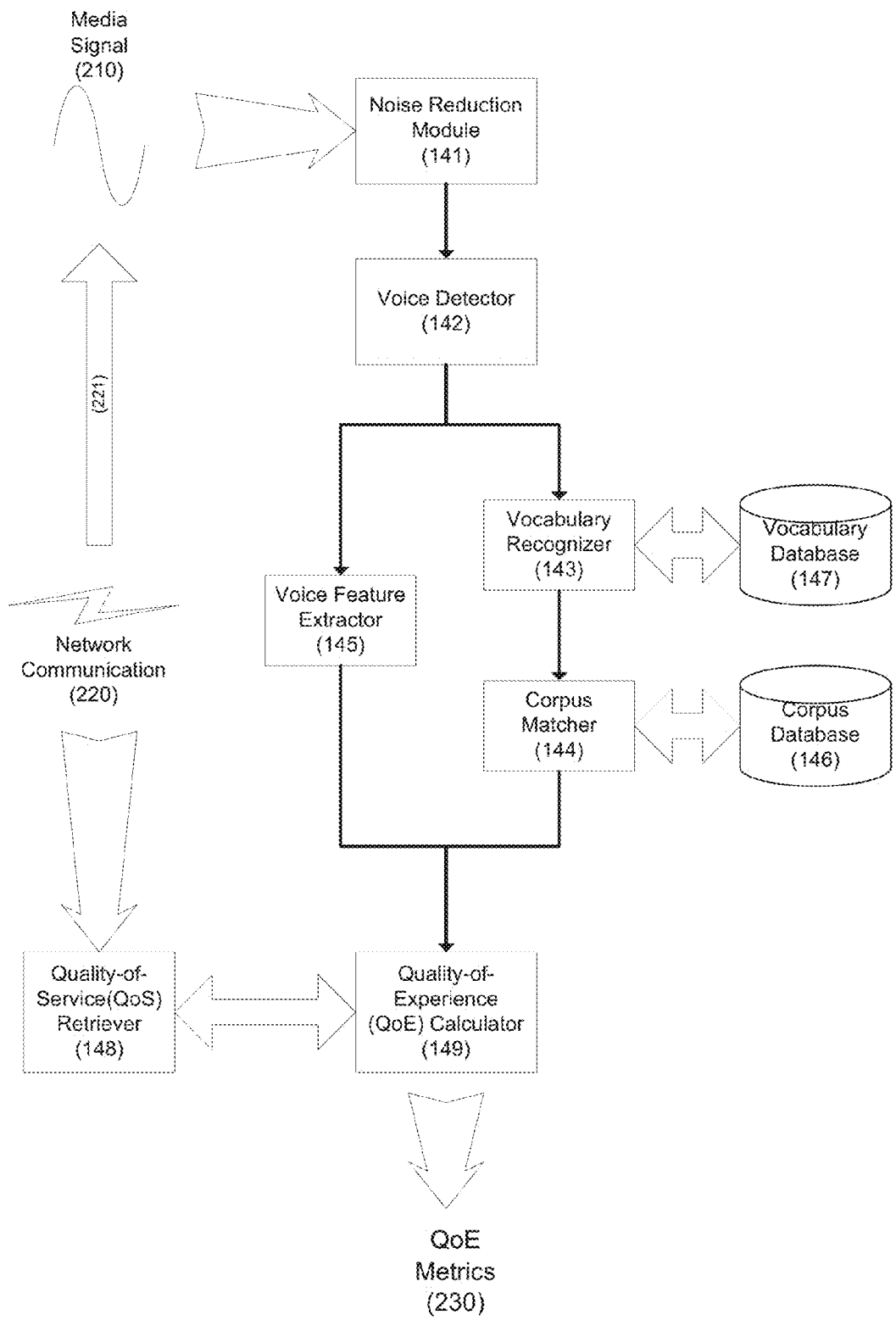
FIG. 2 shows an illustrative embodiment of a process for determining QoE metric for a network communication.

FIG. 2 shows an illustrative embodiment of a process for determining QoE metric for a network communication. As depicted in FIG. 2, a network communication 220 (similar to the network communications 121 and/or 125 of FIG. 1) may be conducted between two or more client devices. The network communication 220 may contain an analog or digital media signal 210, which stores, without limitation, voice, audio, image, and/or video contents. In real time, the network communication 220 may be streaming to the QoE system as a set of packets encoded using certain network protocols. The QoE system may then extract (221) the media signal 210 from the set of packets, and transmit the media signal 210 to the noise reduction module 141 for further processing.

In some embodiments, to process speech or audio contents in the medial signal 210, the noise reduction module 141 may first filter the noise from the media signal 210 by using dynamic noise reduction approaches that reduce or remove sounds not generated by human. The noise reduction module 141 may then transmit the filtered media signal 210 to the voice detector 142. The voice detector 142 may extract voice segments from the media signal 210. Each voice segment may be a single-syllable sound unit. The voice detector 142 may identify the vowel and consonant sounds in the media signal 210, and divide the media signal 210 based on the vowel and consonant sound boundaries.

In some embodiments, the voice detector 142 may detect voice segments in the media signal 210 based on zero-crossing rate and frame energy, and record the start and end times of each of the voice segments. Specifically, zero-crossings are the points in the media signal 210 at which there is no voltage present. By calculating the zero-crossing rate of the media signal 210, the voice detector 12 may detect the presence of voices as well as their frequencies in the media signal 210. In some embodiments, the frame shift, which is the time length between successive frames for the media signal 210 processing, may be 10 milliseconds. The voice detector 142 may also record the source and destination of each network communication, so that it may be used for identifying the source and destination of the voice segments.

In some embodiments, the QoE system may extract one or more experience indicators from the media signal 210 by either using the voice feature extractor 145, or using the vocabulary recognizer 143 and the corpus matcher 144. The QoE system may transmit the voice segments detected by the voice detector 142 to the voice feature extractor 145. The voice feature extractor 145 may extract, from the voice segments, voice features as the experience indicators, and transmit the voice features to the QoE calculator 149. Alternatively, the QoE system may transmit the voice segments to the vocabulary recognizer 143 for recognizing vocabularies. The corpus matcher 144 may identify corpuses in the recognized vocabularies, and transmit the matched corpuses to the QoE calculator 149 for further processing.

In some embodiments, the medial signal 210 may contain image or video signals. And additional components of the QoE system (not shown in FIG. 2) may use facial recognition to extract facial expressions or body gestures from the video signals. The facial expressions and/or body gestures may also be deemed experience indicators. For example, the facial expressions (e.g., raising eyebrows, opening mouth) and the body gestures (e.g., shrugging shoulders, raising hands) that show frustration, anger, and/or confusion may be used for subsequent QoE determination in similar manners as the voice features.

In some embodiments, the voice feature extractor 145 may extract amplitude, time, and/or pitch measurements from the voice segments. Amplitude refers to the energy changes in the voice segments over time. Different energy changes stand for different emotion. For example, energy changes in speeches may show anxiety or anger experienced by the speaker. The voice segments may be measured for such energy changes within a specific timeframe, and the results may be recorded as the amplitude measurements.

In some embodiments, the voice feature extractor 145 may evaluate the voice segments based on time-based analysis. For example, short-time zero-crossing analysis may be an effective voice time-domain analysis for determining the time measurements. Specifically, the short-time average magnitude function may be used to find general location of the first and the last syllable in the voice segments. Then, the unvoiced part of the segment may be expanded using the zero rate in order to get the accurate endpoint of the voice. The time measurement may be a voice pacing rate indicating whether the speaker is speaking fast or slow.

In some embodiments, the pitch measurement represents the perceived fundamental frequency of a sound. Pitch period is the reciprocal of vocal fold vibration frequency, which is quasi-periodic. The voice feature extractor 145 may estimate the pitch period in the voice segments using short-term average. The pitch measurement may show whether the speaker is raising his voice pitch in order to better communicate with the listener and overcome the bad network communication condition. Alternatively, the voice feature extractor 145 may also use multi-layer perception to distinguish and characterize the different emotion states (e.g., anger and normal states) in the voice segments.

In some embodiments, the mere presence of anxiety or anger emotion in the speaker's voice may not be a definitive indication of a poor QoE for the network communication, since the speaker's emotional changes may be caused by the contents of the conversation, not due to the quality of the network communication. Thus, the QoE calculator 149 may further evaluate the objective QoS metric to ascertain the quality of the network communication from the participant's perspective. The QoE calculator 149 may use the QoS retriever 148 to either measure the QoS metrics in real time, or retrieve the historical QoS metrics from external system and device that has previously measured and recorded the QoS metrics of the telephony communication.

In some embodiments, the QoE calculator 149 may request the QoS metrics from the QoS retriever 148 for each voice segment that shows anxiety or anger emotion. If the QoS metrics do not show abnormality, then there is a high possibility that the user's emotional changes are not related to the network communication quality. However, if the QoS metrics show delays, packet losses, jitter, or any other poor-service indicators, then the QoE calculator 149 may determine that the subpar network communication quality may be the cause of the users' emotional changes, and calculate the QoE metric accordingly. The details of QoE metric calculation are further described below.

In some embodiments, the vocabulary recognizer 143 may try to identify words from the voice segments. The vocabulary recognizer 143 may compare the voice segments, either individually or in sequential combinations, with sample words stored in the vocabulary database 147. If a match is found between a sequence of voice segments and a sample word, the vocabulary recognizer 143 may use the start time of the first matched voice segment as the start time for the recognized word, and the end time of the last matched voice segment as the end time for the recognized word. In some embodiments, the vocabulary database 147 may store sample pronunciations for words from multiple languages. The vocabulary recognizer 143 may then transmit the recognized words, along with their start times and end times, to the corpus matcher 144.

In some embodiments, the corpus matcher 144 may try to match the words recognized by the vocabulary recognizer 143 with known corpuses stored in the corpus database 146. The corpus matcher 144 may try to detect any sequence in the recognized words with these known corpuses. Once the corpus matcher 144 detects one or more corpuses in the recognized words, it may also assign a specific flag number to categorize whether the corpus belongs to the delay condition, jitter condition or voice decay condition. For example, the flag number may be 1 for delay condition, 2 for jitter condition, and 3 for voice decay condition. The start time of the corpus is assigned using the start time of the first word in the corpus, and the end time of the corpus is assigned using the end time of the last word in the corpus. The corpus, its start and end times, and its flag number may then be transmitted to the QoE calculator 149 for further processing.

In some embodiments, the QoE calculator 149 may first examine the corpus to determine whether to retrieve QoS metrics for additional evaluation, and calculate the QoE metrics (such as QoE metrics 230 as shown in FIG. 2) based on the corpus and the QoS metric. If the corpus extracted from the media signal 210 may provide an indication that the quality of the network communication 220 is subpar, the QoE calculator 149 may utilize the QoS retriever 148 to retrieve the QoS metrics that are collected within the similar time frame as the transmission of the particular network communication 220 that carries the corpus.

In some embodiments, the presence of multiple corpuses in a speaker's speech may be a clear indication that the speaker is experiencing subpar network communication services, rather than due to the speaker's own issues. For example, when multiple "pardon" or "can you speak louder" are heard, it may show that speaker may actually unable to hear the other end of conversation, not because of the speaker's own hearing problem. Thus, the QoE metric calculation may take the amount and frequency of corpuses in the speech into consideration.

In a typical two-way communication, a first speaker may speak for a period of time, followed by a second speaker making a subsequent speech, which may be followed by the first speaker's additional speech, and so on. In this case, a speech cycle may be defined as a logical unit to store the speeches made by one speaker before the speaker stops or being interrupted by another speaker. Thus, a conversation between two speakers may be organized into two set of speech cycles, each set of speech cycles storing a corresponding speaker's speeches. By evaluating the source and destination information in the network communication 220, the QoE system may associate the speakers with each voice segment, word, or corpus. Therefore, the QoE system may easily determine the speaker for each speech cycle.

Assuming there are two speakers A and B, A's first speech is followed by B's first speech, which is followed by A's second speech, and by B's second speech, and so on. Then, A's first speech may be stored as a first speech cycle, and A's second speech may be stored in the second speech cycle. B's speeches may be stored as a first speech cycle corresponding to B's first speech, and a second speech cycle corresponding to B's second speech. Afterward, the QoE calculator 149 may organize both speakers' speeches into two set of speech cycles, and assign a sequence number for each speech cycle in its corresponding set of speech cycles. Relationships among the speech cycles may also be maintained for tracking the sequences of speech cycle. For example, a link may be established between the two set of speech cycles, showing a speaking order of A's first speech cycle, B's first speech cycle, A's second speech cycle, and B's second speech cycle.

In some embodiments, the start time of a speech cycle may be the start time of the first spoken word in the specific speech cycle. The end time of a speech cycle may be determined using the start time of the other speaker's subsequent speech cycle. For example, the start time of B's first speech cycle may be used as the end time of A's first speech cycle. Likewise, the end time of the B's first speech cycle may be set by the start time of A's second speech cycle. Alternatively, the end time of an opponent speaker's previous speech cycle may be used as the start time of the speaker's current speech cycle.

In some embodiments, the QoE calculator 149 may determine that the corpus and the QoS metrics indicating that the quality of the network communication may be subpar. In this case, the QoE calculator 149 may calculate a QoE metric for each corpus. Specifically, the QoE metric Q may be calculated for a specific time interval, which is defined by the corpus's start time and end time. In other words, Q(t1<=t<t2) represents the QoE metric for a time interval [t1, t2], with t1 and t2 representing the start time and the end time of a specific corpus. The QoE metric is based on a metric function $f$, which is a piecewise function of time t, plus adjustments based on the presence and frequency of previous corpuses. The resulting QoE metric may have a maximum value of 100, representing a user has no issue with the service quality, and a minimum value of 0, representing that the user is not satisfied at all with the service quality.

Assuming there are n corpuses in a specific cycle k, the corresponding start times for corpuses 1 . . . n are $$T_{k11}, T_{k12}, \ldots, T_{k1i}, \ldots, T_{k1n} \ (1<=i<=n).$$

The corresponding end times for the n corpuses are $$T_{k21}, T_{k22}, \ldots, T_{k2i}, \ldots, T_{k2n} \ (1<=i<=n).$$

The corresponding category flag numbers for the n corpuses are $$C_{k1}, C_{k2}, \ldots, C_{ki}, \ldots C_{kn}, \ (1<=i<=n).$$

And the corresponding cycle sequence numbers for the n corpuses are $$S_{k1}, S_{k2}, \ldots, S_{ki}, \ldots, S_{kn} \ (1<=i<=n).$$

In some embodiments, the QoE metric for a specific corpus may be based on a QoE base value, which is calculated using a function $f$, defined as the following:

If $C=1$, then it is delay condition: $f(C,S)=a*b^{(S-1)}$;

If $C=2$, then it is decay condition: $f(C,S)=c*d^{(1-S)}$;

If $C=3$, then it is jitter condition: $f(C,S)=e*f^{(1-S)}$;

a, b, c, d, e, f are positive constants for value adjustments; b>1, d>1, f>1.

Thus, the QoE base value generated by the $f$ function depends on the condition type C, along with the total number of corpuses and the position of the particular corpus in a specific cycle. That is, when there are more than one corpus in a speech cycle, if it is a delay condition, the later corpus may have a bigger QoE base value than the earlier corpuses. In other words, the longer a speaker waits for response from the counterpart, the more impatient the speaker becomes. Thus, the QoS base value may increase exponentially as the sequence number of delay increases. In decay and jitter condition, the speaker may be unsatisfied with counterpart's voice quality. However, as time passes, the speaker may get used to the decay or jitter condition, and may feel less frustrated or impatient as time goes by. Thus, the $f$ function would not grow exponentially, and may even decrease a little for the subsequent corpuses.

In some embodiments, the QoE metric for the first corpus in a particular speech cycle may be initialized based on the QoE metric of the last corpus in the previous speech cycle. The following may be an example of the calculation formula:

$$Q(T_{(k-1)2m}<=t<T_{k21})=50+Q(T_{(k-1)2(m-1)}<=t<T_{(k-1)2m})/2,$$

assuming that there are m corpuses in cycle k-1;
Please note that the initial number "50" and the divider "2" may be adjustable variables.

In some embodiments, the QoE calculator 149 may calculate the QoE metric for any subsequent corpuses in the particular speech cycle using the QoE metric of the previous corpus in the same speech cycle. The following may be an example of the calculation formula:

If $Q(T_{k2i}<=t<T_{k2(i+1)})-f(C_{k(i+2)},S_{k(i+2)})<0$, then $Q(T_{k2(i+1)}<=t<T_{k2(i+2)})=0$; for $1<=i<=(n-2)$.

If $Q(T_{k2i}<=t<T_{k2(i+1)})-f(C_{k(i+2)},S_{k(i+2)})>=0$, then $Q(T_{k2(i+1)}<=t<T_{k2(i+2)})=Q(T_{k2i}<=t<T_{k2(i+1)})-f(C_{k2(i+2)},S_{k(i+2)})$; for $1<=i<=(n-2)$;

Thus, if the QoE base value (which is calculated using function $f$) for the current corpus is larger than the previous corpus' QoE metric, the QoE metric for the current corpus may be the difference between the QoE metric for the previous corpus and the QoE base value. If the base QoE value for the current corpus is smaller than the previous corpus' QoE metric, then the QoE metric for the current corpus may be set to 0. In other words, when the network communication quality is improving, the speaker may feel satisfied, even though the objective quality measurements may show subpar condition.

In some embodiments, the voice features, facial expressions, or body gestures extracted from the media signal may also be similarly used as the corpuses in determining the QoE metrics. For example, for each voice feature, a base value may be generated, and the number and frequency of voice features in a speech cycle may be used for calculating the QoE metric for the voice feature.

Figure 3:
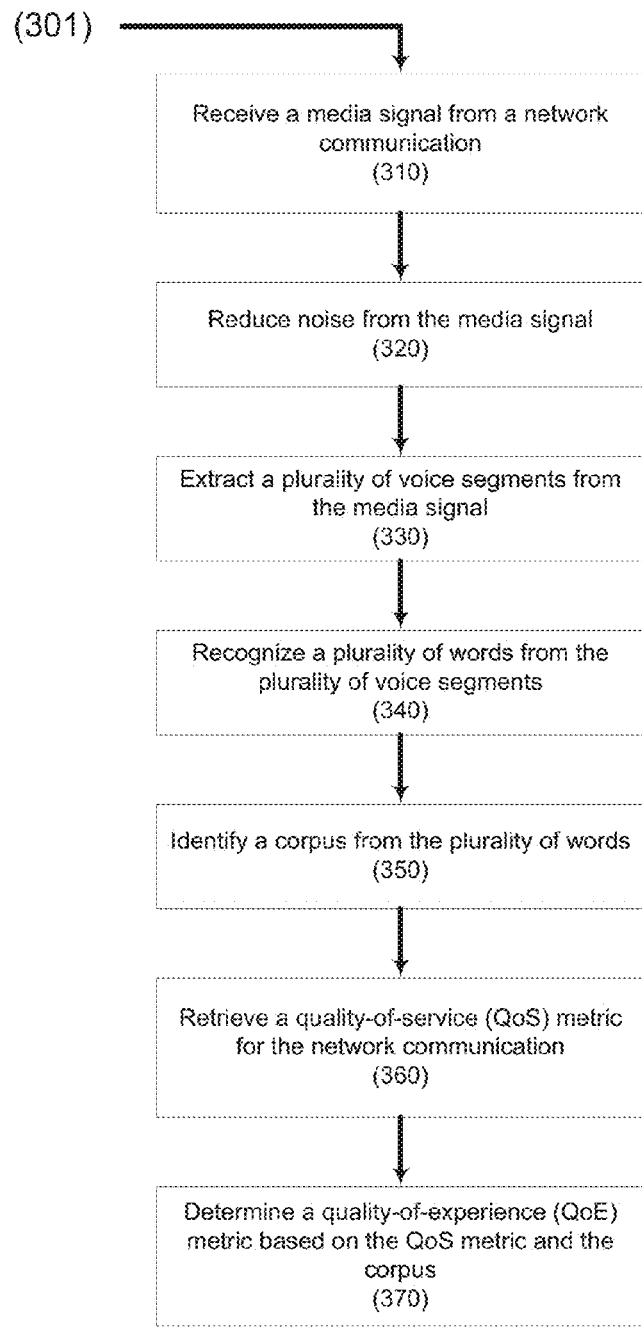
FIG. 3 shows a flow diagram of an illustrative embodiment of a process for using corpus to determine QoE metric for a network communication.

FIG. 3 shows a flow diagram of an illustrative embodiment of a process 301 for using corpus to determine QoE metric for a network communication. The process 301 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations. In some embodiments, machine-executable instructions for the process 301 may be stored in memory, executed by a processor, and/or implemented in a QoE system, such as the QoE system 140 of FIG. 1.

At block 310, a QoE system may receive a network communication originated from a two-way or multi-way communication. The QoE system may extract a media signal from the network communication. The media signal may contain speeches made by one of the participants of the two-way or multi-way communication. At block 320, a noise reduction module of the QoE system may reduce or remove noise from the media signal. At block 330, a voice detector of the QoE system may extract a plurality of voice segments from the media signal. In some embodiments, each of the plurality of voice segments may be a single syllable sound.

At block 340, a vocabulary recognizer of the QoE system may recognize a plurality of words from the plurality of voice segments, based on sample words stored in a vocabulary database. At block 350, a corpus matcher of the QoE system may identify a corpus from the plurality of words, using sample corpuses stored in a corpus database. The corpus may be deemed an experience indicator. At block 360, the QoE system may evaluate the corpus and determine that the corpus indicating a subpar service quality for the network communication. In this case, the QoE system may retrieve a QoS metric for the network communication. If the QoS metric objectively indicates that the quality of the network communication is subpar, the QoE system may proceed to block 370. Otherwise, the QoE system may proceed to block 310 for processing additional media signals.

At block 370, the QoE system may calculate a QoE metric for the corpus and the network communication based on the corpus and the QoS metric. In some embodiments, the QoE system may utilize the QoE metrics from previous corpus in the same cycle or corpus from previous cycle for calculating the QoE metric.

Figure 4:
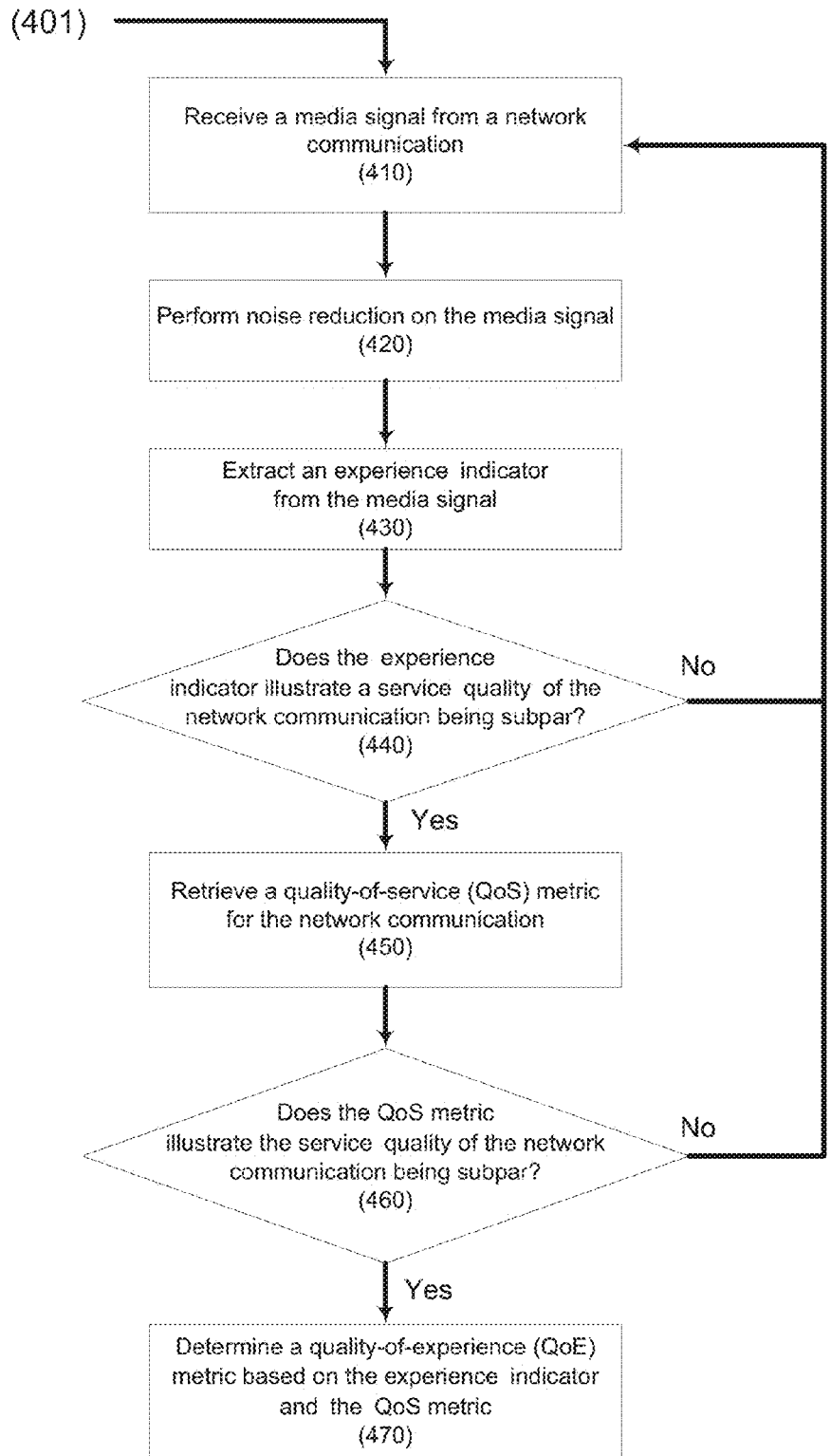
FIG. 4 shows a flow diagram of an illustrative embodiment of a process for using experience indicator to determine QoE metric for a network communication.

FIG. 4 shows a flow diagram of an illustrative embodiment of a process 401 for using experience indicator to determine QoE metric for a network communication. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations. In some embodiments, machine-executable instructions for the process 401 may be stored in memory, executed by a processor, and/or implemented in a QoE system, such as the QoE system 140 of FIG. 1.

At block 410, a QoE system may receive a network communication which contains a media signal originated from a two-way or multi-way communication. At block 420, a noise reduction module of the QoE system may reduce or remove noise from the media signal. At block 430, a voice detector of the QoE system may extract an experience indicator from the media signal. The experience indicator may show the participant his subjective evaluation of the service quality of the network communication. In some embodiments, the experience indicator may be a corpus. Alternatively, the experience indicator may be a voice feature, a facial expression, or a body gesture.

At block 440, the QoE system may evaluate the experience indicator to see whether it illustrates a service quality of the network communication being subpar. If the evaluation at the block 440 is "No", then the process 401 may proceed to block 410 to receive and process additional media signals. If the evaluation at the block 440 is "Yes", then the process 401 may proceed to block 450. At block 450, the QoE system may retrieve a QoS metric for the network communication.

At block 460, the QoE system may evaluate the QoS metric and determine whether the QoS metric indicates the service quality of the network communication being subpar. If the block 460 determination returns "No", then process 401 may proceed to block 410. If the block 460 determination returns "Yes", then process 401 may proceed to block 470. At block 470, the QoE system may calculate a QoE metric for the network communication based on the QoS metric and the experience indicator.

In some embodiments, the QoE system may collect multiple experience indicators from block 460 before calculating the QoE metric for the network communication. As described above, the QoE metric may be calculated based on the QoS metric and some of the multiple experience indicators in a specific cycle, or some of the multiple experience indicators in several cycles. Alternatively, the QoE system may calculate multiple QoE metrics based on the QoS metric and the multiple experience indicators.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

FIG. 5 is a block diagram of an illustrative embodiment of a computer program product 500 for implementing a method for determining a quality-of-service of a mobile application executing on a mobile device. Computer program product 500 may include a signal bearing medium 502. Signal bearing medium 502 may include one or more sets of executable instructions 504 that, when executed by, for example, a processor, may provide the functionality described above. Thus, for example, referring to computer system of FIG. 1, the QoE system 140 may undertake one or more of the operations shown in at least FIG. 3 or FIG. 4 in response to instructions 504 conveyed by signal bearing medium 502.

In some implementations, signal bearing medium 502 may encompass a non-transitory computer readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Computer program product 500 may be recorded on non-transitory computer readable medium 506 or another similar recordable medium 508.

Figure 6:
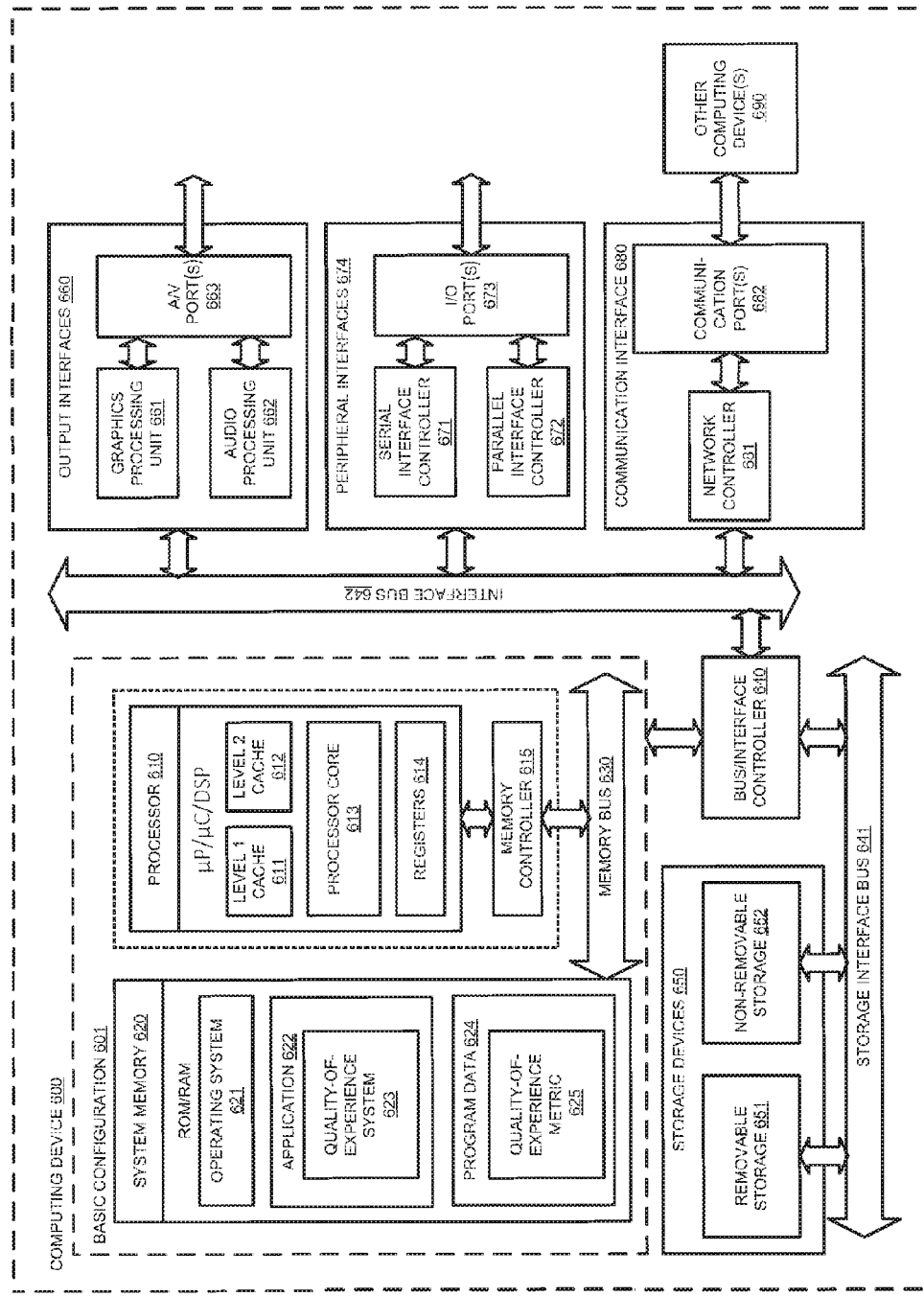
FIG. 6 shows a block diagram of an illustrative embodiment of an example computing device that can be arranged as a QoE system in accordance with the present disclosure.

FIG. 6 shows a block diagram of an illustrative embodiment of an example computing device 600 that can be arranged as a QoE system for use in accordance with the present disclosure. In a very basic configuration 601, computing device 600 may include one or more processors 610 and a system memory 620. A memory bus 630 may be used for communicating between the processor 610 and the system memory 620.

Depending on the desired configuration, processor 610 may be of any type including but not limited to a microprocessor ($\mu$P), a microcontroller ($\mu$C), a digital signal processor (DSP), or any combination thereof. Processor 610 can include one or more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 may be of any type including but not limited to volatile memory (such as RAM), non-volatile memory (such as ROM, flash memory) or any combination thereof. System memory 620 may include an operating system 621, one or more applications 622, and program data 624. Application 622 may include a quality-of-experience system 623 that is arranged to perform the functions and/or operations as described herein including at least the functional blocks and/or operations described with respect to process 301 of FIG. 3 and process 401 of FIG. 4. Program Data 624 may include quality-of-experience metric 625 generated by the quality-of-experience system 623. In some example embodiments, application 622 may be arranged to operate with program data 624 on an operating system 621 such that implementations of mobile application quality-of-service determination may be provided as described herein. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 674 may include a serial interface controller 671 or a parallel interface controller 672, which may be configured to communicate with external devices such as input devices (e.g., keyboard, mouse, pen, voice input device, touch input device) or other peripheral devices (e.g., printer, scanner) via one or more I/O ports 673. An example communication interface 680 includes a network controller 681, which may be arranged to facilitate communications with one or more other computing devices 690 over a network communication link via one or more communication ports 682.

The network communication link may be one example of a communication media. Communication media may typically be embodied by computer readable instructions, data structures, program modules, or other transport mechanism, and may include any information delivery media. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory; and a transmission type medium such as a digital and/or an analog communication medium (e.g., a fiber optic cable, a waveguide, a wired communications link, a wireless communication link).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to"). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to determine a quality-of-experience (QoE) metric for a network communication, comprising:
   receiving a media signal from the network communication, wherein the media signal includes a voice component;
   extracting an experience indicator from the voice component, wherein the experience indicator is a voice feature descriptive of a service quality of the network communication;
   evaluating the experience indicator;
   retrieving a quality-of-service (QoS) metric if the evaluated experience indicator reflects the service quality of the network possibly being subpar; and
   determining the QoE metric for the network communication based on the evaluated experience indicator and the retrieved QoS metric for the network communication.

2. The method as recited in claim 1, wherein the voice feature is an emotion-change amplitude measurement.

3. The method as recited in claim 1, wherein the voice feature is a voice-pacing time measurement.

4. The method as recited in claim 1, wherein the voice feature is a sound-volume pitch measurement.

5. The method as recited in claim 1, wherein the voice feature is a corpus.

6. The method as recited in claim 1, further comprising detecting the voice component in the media signal based on zero-crossing rate.

7. The method as recited in claim 1, further comprising recording a start time and an end time for the voice component.

8. The method as recited in claim 1, wherein the determining the QoE metric is performed if the QoS metric the service quality of the network possibly being subpar.

9. A method to determine quality of a network communication, comprising:
receiving a media signal from the network communication;
extracting a first corpus from the media signal, wherein the extraction of the first corpus comprises:
reducing noise from the received media signal,
extracting a plurality of voice segments from the media signal,
recognizing a plurality of words from the plurality of voice segments, and
identifying the first corpus based on the plurality of words;
extracting an experience indicator based on evaluating the first corpus;
retrieving a quality-of-service (QoS) metric if the experience indicator reflects the service quality of the network possibly being subpar; and
determining a first QoE metric for the network communication based on the evaluated first corpus and the retrieved QoS metric for the network communication.

10. The method as recited in claim 9, wherein the determining of the first QoE metric further comprising:
retrieving a second QoE metric for a second corpus, wherein the first corpus is subsequent to the second corpus in the media signal; and
initializing the first QoE metric based on the second QoE metric, the first corpus, and the QoS metric for the network communication.

11. The method as recited in claim 9, wherein the determining of the first QoE metric further comprising:
retrieving a second QoE metric for a second corpus, wherein the first corpus is subsequent to the second corpus in the media signal; and
exponentially increasing the first QoE metric based on the second QoE metric, the first corpus, and the QoS metric for the network communication.

12. The method as recited in claim 9, wherein the service quality indicated by the first corpus has a delay condition, a decay condition, or a jitter condition.

13. A system configured to determine a quality-of-experience (QoE) metric for a network communication, comprising:
a processor; and
a memory encoded with executable instructions, which in response to execution by the processor, causes the processor to
receive a media signal from the network communication, wherein the media signal includes a voice component,
extract an experience indicator from the voice component, wherein the experience indicator is a voice feature descriptive of a service quality of the network communication,
evaluate the experience indicator,
retrieve a quality-of-service (QoS) metric if the evaluated experience indicator reflects the service quality of the network possibly being subpar, and
determine the QoE metric for the network communication based on the evaluated experience indicator and the retrieved QoS metric for the network communication.

14. The system as recited in claim 13, wherein the memory is encoded with additional instructions for detecting the voice component in the media signal based on zero-crossing rate.

15. The system as recited in claim 13, wherein the memory is encoded with additional instructions for recording a start time and an end time for the voice segment.

16. The system as recited in claim 13, wherein the memory is encoded with additional instructions for determining the QoE metric if the QoS metric the service quality of the network possibly being subpar.

17. A system configured to determine quality of a network communication, comprising:
a processor; and
a memory encoded with executable instructions, which in response to execution by the processor, causes the processor to
receive a media signal from the network communication;
extract a first corpus from the media signal, wherein the extraction of the first corpus includes
reducing noise from the received media signal,
extracting a plurality of voice segments from the media signal,
recognizing a plurality of words from the plurality of voice segments, and
identifying the first corpus based on the plurality of words;
extract an experience indicator based on evaluating the first corpus,
retrieve a quality-of-service (QoS) metric if the experience indicator reflects the service quality of the network possibly being subpar; and
determine a first QoE metric for the network communication based on the evaluated first corpus and the retrieved QoS metric for the network communication.

18. The system as recited in claim 17, wherein the instructions for determining the first QoE metric, in response to execution by the processor, cause the processor to further:
retrieve a second QoE metric for a second corpus, wherein the first corpus is subsequent to the second corpus in the media signal; and
initialize the first QoE metric based on the second QoE metric, the first corpus, and the QoS metric for the network communication.

19. The system as recited in claim 17, wherein the instructions for determining the first QoE metric, in response to execution by the processor, cause the processor to further:
retrieve a second QoE metric for a second corpus, wherein the first corpus is subsequent to the second corpus in the media signal; and
exponentially increase the first QoE metric based on the second QoE metric, the first corpus, and the QoS metric for the network communication.

20. The system as recited in claim 17, wherein the service quality indicated by the first corpus has a delay condition, a decay condition, or a jitter condition.

* * * * *